(No Model.)
W. STROUDLEY
WHEEL FOR RAILWAY VEHICLES.
No. 415,745. Patented Nov. 26, 1889.
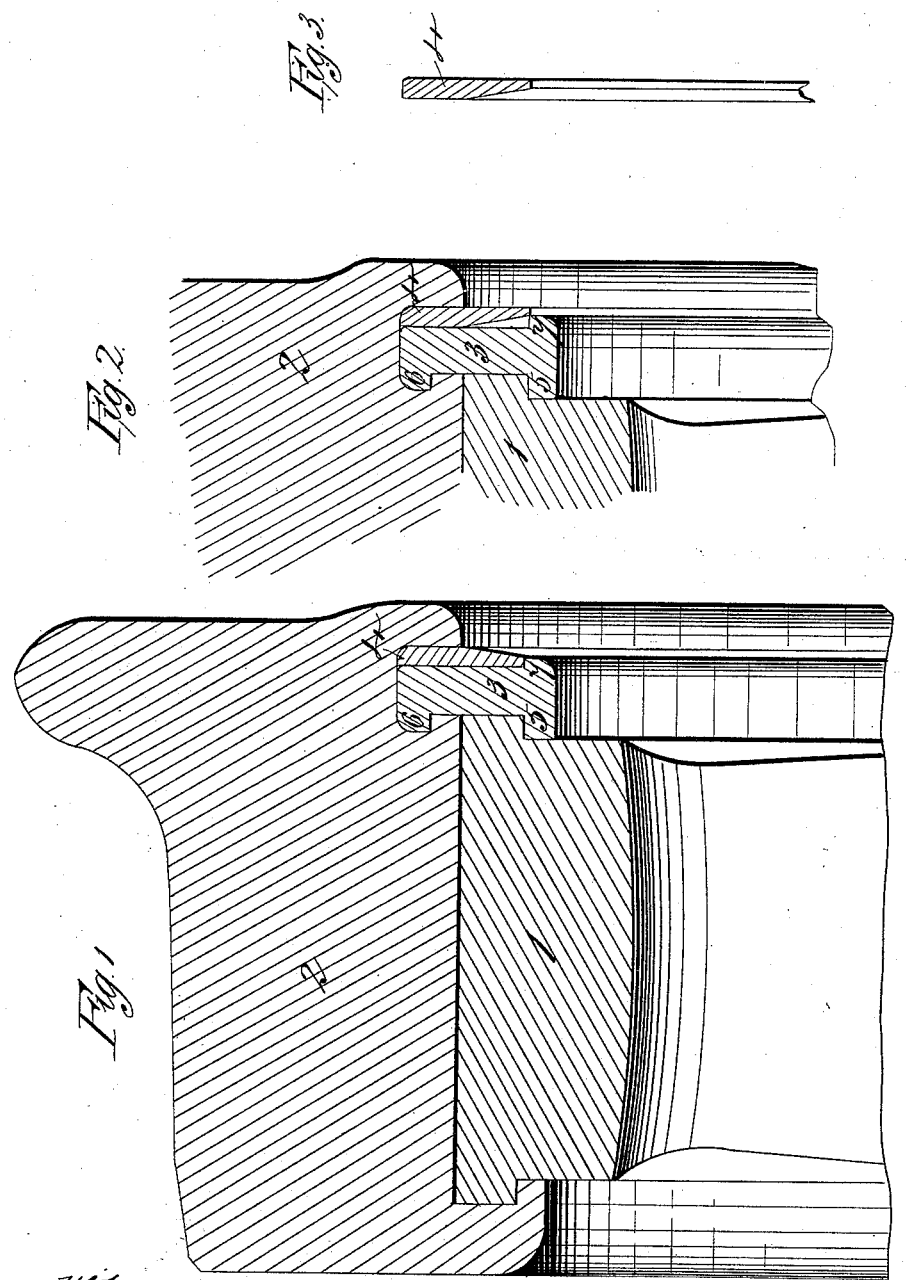

UNITED STATES PATENT OFFICE.

WILLIAM STROUDLEY, OF BRIGHTON, COUNTY OF SUSSEX, ASSIGNOR TO HIMSELF, AND SAMUEL CARLTON, OF SWINDON, ENGLAND.

WHEEL FOR RAILWAY-VEHICLES.

SPECIFICATION forming part of Letters Patent No. 415,745, dated November 26, 1889.

Application filed April 9, 1889. Serial No. 306,610. (No model.) Patented in England February 27, 1889, No. 3,512; in New South Wales May 6, 1889, and in South Australia May 14, 1889, No. 1,302.

*To all whom it may concern:*

Be it known that I, WILLIAM STROUDLEY, a subject of the Queen of Great Britain and Ireland, residing at Brighton, in the county of Sussex, England, have invented new and useful Improvements in Wheels for Railway-Vehicles, (for which I have obtained Letters Patent in England February 27, 1889, No. 3,512; in New South Wales May 6, 1889, and in South Australia May 14, 1889, No. 1,302,) of which the following is a specification.

In the specification of Letters Patent No. 305,287 there is described a way of securing tires to the bodies of the wheels of railway-vehicles, which consists in forming an annular lip or lug on each side of the wheel rim or body, the lip or lug on the outside engaging with a correspondingly-shaped recess or groove in the tire, while the lip or lug on the inside engages with a clip-ring by which the tire is connected to the rim or body. This clip-ring has two annular lips or lugs upon it, formed so that the one shall fit in the recess or groove just mentioned in the tire and the other into a recess or under the lip or lug of the wheel rim or body. The clip-ring is secured in place by an annular wedge-shaped key or lewis ring, which is sprung or inserted into a groove in the tire behind the clip-ring, and is secured by the edge of the tire being hammered or laid down onto the wedge or inclined surface of the wedge-ring.

Now the present invention has for its object to dispense with or reduce the hammering of the tire, which has been usual according to the method of attachment referred to above, thus obviating the risk of fracture and enabling a much harder and more durable steel tire to be employed. To this end a ledge, shoulder, or check is formed on the outside of the inner or clip ring, near its inner circumference. This inner or clip ring is secured in position by means of a wedge or lewis ring, which is either cut across and sprung in behind the inner or clip ring or is inserted in two or more parts, filling the vacant space in the groove formed in the tire to receive the clip-ring. The wedge or lewis ring is beveled or chamfered for a portion of its breadth at its inner side, and when in position is laid down by a hammer, by which its chamfered side is applied closely to the clip-ring, and its inner edge is made to surround the ledge, shoulder, or check formed on the clip-ring. The lewis ring is thus prevented from leaving the groove, while at the same time it secures the clip-ring accurately in place without being made of the taper form within the groove, as heretofore. This construction gives an additional support or buttress should the tire break into short pieces, and prevents the edge of the clip-ring from leaving the rim of the wheel. Both rings may be made of mild steel, the lewis ring being somewhat softer than the clip-ring, so that it may be laid down with a hammer into its place. This hammering will of itself stiffen and harden the ring. Thus the flange or clip of the tire itself will not require to be struck with a hammer, as with the construction hereinbefore referred to, or if at all only very lightly.

There are several ways of getting both the clip-ring and the lewis ring into position. One way is to make across the ring a cut and to chamfer the ends at each side of the cut to admit of springing the ring into place. Another and a better way is to cut out of the ring a piece of sufficient length to allow the remainder to be sprung into place, the smaller piece being afterward inserted to complete the ring in place. The ring may, however, be inserted into position in several pieces.

On the accompanying sheet of drawings, Figure 1 shows in section so much of one form of a wheel body and tire as is needful to illustrate this invention. Fig. 2 is a similar view to Fig. 1, showing the lewis ring as it appears before it is hammered or laid down onto the clip-ring as it is shown in Fig. 1. Fig. 3 shows a section of the lewis ring.

1 is the wheel rim or body; 2, the tire; 3, the clip-ring; 4, the wedge or Lewis ring.

The clip-ring has on one side two annular lips or lugs 5 6, the one engaging with the rim or body and the other with the tire. At its opposite side it has a ledge, shoulder, or check 7. The upper portion of the clip-ring lies within a groove in the tire and is held in place by the wedge or lewis ring 4, which is inserted into the groove behind. The wedge-ring in this example is of the shape shown in Fig. 3, and when it is first put into place its beveled part occupies the position shown in Fig. 2. It is then laid down into the position shown in Fig. 1 and securely locks the wheel-body, the tire, and the ring 3 all together.

What I claim is—

1. In a wheel for a railway-vehicle, a clip-ring having on one side two lips or lugs engaging, respectively, with the body and with the tire of the wheel, and having on the other side a ledge, shoulder, or check to serve as a key or support to a wedge or lewis ring.

2. In a wheel for a railway-vehicle, a clip-ring having a ledge, shoulder, or check, in combination with a wedge or lewis ring laid down onto the said ledge, shoulder, or check.

3. In a wheel for a railway-vehicle, the combination of the clip-ring 3, having the lips or lugs 5 6 and the shoulder or check 7, with the wedge or lewis ring 4, substantially as described.

4. In a wheel for a railway-vehicle, the combination of the wheel rim or body 1, tire 2, clip-ring 3, formed with ledge, shoulder, or check 7, and lewis ring 4, held in place by said ledge, shoulder, or check 7, substantially as described.

In testimony whereof I have signed my name to this specification in the presence of two subscribing witnesses.

WILLIAM STROUDLEY.

Witnesses:
  HENRY GEORGE WEIGHT,
  JOHN D. VENN,
*Both of 9 Gracechurch Street, London.*